United States Patent [19]

Shoji

[11] Patent Number: 4,460,727
[45] Date of Patent: Jul. 17, 1984

[54] WATER BASE PIGMENT INK COMPOSITION FOR WRITING

[75] Inventor: Yukito Shoji, Osaka, Japan

[73] Assignees: Dainichiseika Color & Chemicals Mfg. Co., Ltd., Tokyo; Sakura Color Products Corp., Osaka, both of Japan

[21] Appl. No.: 435,664

[22] Filed: Oct. 21, 1982

[30] Foreign Application Priority Data

Nov. 7, 1981 [JP] Japan ............................ 56-179499

[51] Int. Cl.$^3$ ........................... C08K 3/20; C08K 5/21
[52] U.S. Cl. ..................... 524/215; 524/556; 260/DIG. 38; 106/23
[58] Field of Search ............... 260/DIG. 38; 524/211, 524/213, 215, 556, 560, 562

[56] References Cited

U.S. PATENT DOCUMENTS 4,101,480  7/1978  Ruf ......................................... 106/20

FOREIGN PATENT DOCUMENTS 56-28256  3/1981  Japan ........................... 260/DIG. 38

Primary Examiner—Joseph L. Schofer
Assistant Examiner—T. M. Reddick
Attorney, Agent, or Firm—Oblon, Fisher, Spivak, McClelland & Maier

[57] ABSTRACT

A water base pigment ink composition for writing comprises a pigment, a dispersing agent, an anti-drying agent and an aqueous medium, in which said dispersing agent is a water soluble amine salt or ammonium salt of a copolymer comprises at least 50 molar % of a hydrophobic addition-polymerizable monomer and less than 50 molar % of acrylic acid or methacrylic acid, and said anti-drying agent is urea, thiourea or a derivative thereof.

5 Claims, No Drawings

WATER BASE PIGMENT INK COMPOSITION FOR WRITING

BACKGROUND OF THE INVENTION

1. FIELD OF THE INVENTION

The present invention relates to a water base ink composition for writing wherein a pigment is used as the coloring agent.

2. Description of the Prior Art

Hertofore, dyestuff type inks were widely used as inks for felt pens, sign pens, ball point pens or brushes. The dyestuff type inks were inferior in the light fastness and water resistance. In recent years, various pigment type water base inks for writing have been proposed. However, pigments are insoluble in the ink medium, and it is difficult to obtain a stable fine dispersion of the pigment particles. Further, when such an ink is filled in a pen for actual use and if the cap is not put on the pen from inadvertence, it is likely that the solvent will evaporate from the tip of the pen whereupon the resin will precipitate or the pigment will coagulate, and consequently the ink will not come out clearly or writing becomes impossible. In an attempt to overcome these difficulties, it has been proposed to use a polyvinyl alcohol or other water soluble polymer as a dispersing agent for the pigments. While such an attempt has been found to be effective to some extent, it brings about other drawbacks that the water resistance of the written letters or the like is thereby lost and when brought in contact with water, the written letters tend to blur due to the blotting of the ink.

SUMMARY OF THE INVENTION

Accordingly it is an object of the present invention to overcome the above mentioned difficulties of the conventional ink compositions and to provide a water base pigment ink composition which provides good pigment dispersion stability during storage or during actual use in a pen so that it does not lead to writing difficulties even when the pen is inadvertently left uncapped, and which gives writings having sufficient water resistance.

As a result of an extensive research, the present inventor has found that it is possible to improve the dispersion stability of a pigment with use of a certain specific water soluble resin as the dispersing agent for the water base pigment ink and to prevent the evaporation of the solvent with use of a specific water soluble compound as the anti-drying agent, whereby a water base pigment ink composition is obtainable where the difficulties of the conventional compositions are sufficiently eliminated.

Namely, the present invention provides a water base pigment ink composition for writing which comprises a pigment, a dispersing agent, an anti-drying agent and an aqueous medium, in which said dispersing agent is a water soluble amine salt or ammonium salt of a copolymer comprising at least 50 molar % of a hydrophobic addition-polymerizable monomer and less than 50 molar % acrylic acid or methacrylic acid, and said anti-drying agent is urea, thiourea, ethylene urea or a derivative thereof.

DETAILED DESCRIPTION OF THE PREFERRED EMBODIMENTS

Now, the present invention will be described in detail with reference to preferred embodiments.

The pigments to be used in the present invention are conventional organic or inorganic pigments. Any pigment may be used without trouble in the present invention. Preferred pigments include carbon black, quinacridone pigments, phthalocyanine pigments, azo pigments, anthraquinone pigments, dioxazine pigments, indigo pigments, perylene pigments, perynone pigments, isoindolenone pigments, titanium oxide, cadmium sulfide pigments, and iron oxides. The pigment is used usually in an amount of from about 3 to 30% by weight, based on the total ink composition.

The dispersing agent of the present invention is a copolymer comprising a water soluble amine salt or ammonium salt of acrylic acid or methacrylic acid, as a water soluble monomer. The amount of the water soluble monomer is less than 50 molar %, preferably from 5 to 40 molar %, based on the total amount of the monomers used. If the amount of the water soluble monomer exceeds 50 molar %, the water resistance of writings tends to be inadequate when written on various types of the writing medium (main paper). On the other hand, if the amount is less than about 5 molar %, no adequate effectiveness as the dispersing agent will be obtainable. The hydrophobic addition-polymerizable monomer to be copolymerized with the above water soluble monomer may preferably be various esters of acrylic or methacrylic acid, styrene or styrene derivatives and other hydrophobic addition polymerizable monomers. The copolymerization of the monomers can be conducted by a conventional method, whereby a desired product can readily be obtained. It is preferred to use the copolymer in the form of an ammonium salt or an amine salt so that it is soluble as such a salt in the aqueous medium. The dispersing agent of the present invention is used in an amount of from about 5 to about 300 parts by weight, preferably from about 10 to about 100 parts by weight, based on 100 parts by weight of the pigment.

The anti-drying agent of the present invention is urea, addition products of urea with various inorganic substances, thiourea, ethylene urea or their derivatives. Such anti-drying agent is used in an amount of from 0.5 to 50% by weight, based on the total ink composition. It is preferred to use it in an amount of from about 2.5 to about 40% by weight. The object of the present invention can be attained by using this anti-drying agent in combination with the above mentioned specific dispersing agent.

The aqueous medium to be used in the present invention is composed mainly of water, and it is used in an amount of from 15 to 75% by weight, preferably from 40 to 60% by weight, based on the total amount of the ink composition. It is preferred that the aqueous medium comprises 100 parts by weight of water and from about 2 to 50 parts by weight of a high boiling point water-soluble organic solvent such as glycerine, ethylene glycol, diethylene glycol or propylene glycol. These organic solvents have been used as an anti-drying agent in conventional ink compositions. However, the object of the present invention cannot be attained with use of these organic solvents alone.

The essential components of the ink composition for writing according to the present invention are the above mentioned four components. However, other additives such as various antiseptics, surfactants, etc. which are commonly used in the conventional ink compositions, may optionally be incorporated to such an extent that they do not adversely affect the object of the present invention.

The water base pigment ink composition for writing according to the invention is thus composed of the above mentioned components in the above mentioned proportions. There may be employed various methods for its preparation. For instance, a typical method is to dissolve and disperse the above mentioned components by a conventional dispersing apparatus such as a ball mill, a homogenizer, a sand grinder, a speed line mill or a roll mill.

By virtue of the specific dispersing agent, the water base pigment ink composition of the present invention is capable of providing adequate pigment dispersion stability during its storage or during its use in a pen, and it remains stable for a long period of time without undergoing precipitation or coagulation of the pigment particles. It is thus unlikely that the pigment coagulates to cause clogging of the tip of the pen such as a felt pen. Further, by virtue of the specific anti-drying agent, the evaporation of the aqueous medium is very much prevented even when the pen is inadvertently left uncapped, whereby the tendency for unclear writing or writing incapability can be minimized. Even when it becomes to be incapable of writing, its writing capability will be revived soon after the cap is properly placed on the pen again. The mechanism of this phenomenon is not clearly understood. However, it is considered that the hydrophobic portion of the dispersing agent and the pigment, as well as the hydrophilic portion of the dispersing agent and the aqueous medium, are attracted and bonded to each other by affinity thereby to prevent the coagulation of the pigment particles, while a hydrogen bond is formed among the hydrogen atom bonded to the nitrogen atom of the amine base or the ammonium base, the hydrogen atom bonded to the nitrogen atom of the urea or thiourea, etc. and the hydrogen atom of the hydroxyl group of the aqueous medium, whereby the evaporation of the aqueous medium is prevented. Further, when the medium at the tip of the pen is reduced by evaporation, the medium in the ink at the interior of the pen will be withdrawn by the action of the above mentioned hydrogen bond so that the tip of the pen will regain the writing ability.

Letters or the like written with the ink composition of the present invention have adequate water resistance. This is probably attributable to the fact that the specific copolymer used as the dispersing agent is neutralized by the acidity of paper or it releases ammonia whereby it is converted from a salt to a free carboxylic acid state, and it becomes insoluble upon contact with water even in the presence of urea or the like.

Now, the present invention will be described in further details with reference to the Examples, in which the "parts" and "%" are meant for "parts by weight" and "% by weight" unless otherwise specified.

EXAMPLE 1

Ten parts of an amine salt of a styrene-butylacrylate-methacrylic acid (in molar ratio of 30:40:30) copolymer, 20 parts of ethylene glycol, 40 parts of water, 16 parts of carbon black and 14 parts of urea were subjected to dispersing treatment for 30 hours in a ball mill. Then, 20 parts of ethylene glycol and 40 parts of water were further added and the mixture was subjected to dispersion treatment for further 20 hours. Coarse pigment particles were removed from the dispersion by centrifugal separation, whereby a water base pigment ink composition for writing containing 9.0% of the pigment was obtained.

COMPARATIVE EXAMPLE 1

A comparative water base pigment ink composition was prepared in the same manner as in Example 1 except that urea was omitted.

EXAMPLE 2

Ten parts of an ammonium salt of a styrene-methylmethacrylatehydroxyethylmethacrylate-acrylic acid (in molar ratio of 30:30:20:20) copolymer, 20 parts of ethylene glycol, 10 parts of diethylene glycol, 40 parts of water, 15 parts of copper Phthalocyanine Blue pigment and 20 parts of sodium nitrate-urea complex, were subjected to dispersion treatment for 25 hours in a ball mill. Then, 10 parts of ethylene glycol and 40 parts of water were further added and the mixture was subjected to dispersion treatment for further 30 minutes. Coarse pigment particles were removed from the dispersion by centrifugal separation, whereby a water base pigment ink composition for writing containing 8.5% of the pigment was obtained.

COMPARATIVE EXAMPLE 2

A comparative water base pigment ink composition was prepared in the same manner as in Example 2 except that sodium nitrate urea was omitted.

EXAMPLE 3

Ten parts of an ammonium salt of an ethylmethacrylate-butylmethacrylate-hydroxyethylmethacrylate-methacrylic acid (in a molar ratio of 25:40:20:15) copolymer, 20 parts of ethylene glycol, 5 parts of dipropylene glycol, 40 parts of water, 15 parts of red quinacridone pigment and 20 parts of thiourea, were subjected to dispersion treatment for 2 hours by a paint shaker. Then, 20 parts of ethylene glycol and 40 parts of water were further added and the mixture was subjected to dispersion treatment for further 10 minutes. Coarse pigment particles were removed from the obtained dispersion, whereby a water base pigment ink composition for writing containing 8.8% of the pigment was obtained.

COMPARATIVE EXAMPLE 3

A comparative water base pigment ink composition for writing was obtained in the same manner as in Example 3 except that thiourea was omitted.

PRACTICAL USE TESTS

Each of the water base pigment ink compositions of Examples 1 to 3 and Comparative Examples 1 to 3 was filled in a plastic signing pen having a polyester ink-absorbent reservoir and an extrusion-molded polyacetal pen point (0.58 mm$\phi$), and subjected to various performance tests. The results thereby obtained are shown in Table 1.

Test A: Accelerated storage test at 50° C.

The sign pen was kept at 50° C. in a constant temperature chamber, and the number of days till the pen becomes to be incapable of writing was measured.

Test B: Uncapped pen test

The sign pen was left uncapped at 20° C. under a humidity of 50% in a constant temperature and humidity chamber, and the time till the pen becomes to be incapable of writing was measured.

Test C: Writing capability revival test

The sign pen was left uncapped at 20° C. under a humidity of 50% for 72 hours whereupon the pen became to be incapable of writing. Then, the cap was put on the pen and the time till the writing capability revived was measured.

TABLE 1

| Ink Composition | Test A | Test B | Test C |
|---|---|---|---|
| Example 1 | Capable of writing for 6 months | Capable of writing for 72 hours | Revived in one day |
| Comparative Example 1 | Became incapable of writing in 6 weeks | Became incapable of writing in 6 hours | Not revived even after 2 months |
| Example 2 | Capable of writing for 4 months | Capable of writing for 72 hours | Revived in one day |
| Comparative Example 2 | Became incapable of writing in 3 weeks | Became incapable of writing in 6 hours | Not revived even after 1 month |
| Example 3 | Capable of writing for 4 months | Capable of writing for 100 hours | Revived in one day |
| Comparative Example 3 | Became incapable of writing in 3 weeks | Became incapable of writing in 6 hours | Not revived even after 1 month |

EXAMPLES 4–7

Water base pigment ink compositions for writing were prepared in the same manner as in Example 1 except that the amine salt of the copolymer was replaced respectively by an amine salt of a methylmethacrylatehydroxyethylmethacrylate-methacrylic acid (in molar ratio of 50:20:30), an amine salt of an ethylmethacrylate-hydroxyethylmethacrylate-acrylic acid (in a molar ratio of 60:20:20), an amine salt of a parachloromethyl styrene-methylmethacrylate-acrylic acid (in a molar ratio of 40:40:20) and an amine salt of a methylmethacrylate-acrylic acid-methacrylic acid (in molar ratio of 80:10:10). The ink compositions were tested in the same manner and they were found to have the same properties as the water base pigment ink composition of Example 1.

I claim:

1. A water based pigment ink composition for writing, comprising:
   (1) from 3 to about 30% by weight of a pigment, based on the total ink composition;
   (2) from 5 to 300 parts by weight of a dispersing agent, based on 100 parts by weight of pigment in the ink composition, which is a copolymer of from 5 to less than 50 mol % of a water-soluble amine salt or ammonium salt of acrylic acid or methacrylic acid with the remaining monomer being at least one ester of acrylic or methacrylic acid, styrene or styrene derivative;
   (3) from 0.5 to 50% by weight of urea, thiourea or derivative thereof as an anti-drying agent, based on the total ink composition; and
   (4) from 15 to 75% by weight of an aqueous medium, based on the total amount of ink composition, containing from 2 to 50 parts by weight of ethylene glycol, glycerine, diethylene glycol, propylene glycol and/or dipropylene glycol per 100 parts by weight of water, as a high boiling point water-soluble organic solvent.

2. The ink composition according to claim 1 which contains from about 10 to about 100 parts by weight of the dispersing agent per 100 parts by weight of the pigment.

3. The ink composition according to claim 1 which contains from about 2.5 to 40% by weight of the anti-drying agent (3).

4. The ink composition according to claim 1 which contains from 40 to 60% by weight of the aqueous medium.

5. The ink composition according to claim 1 wherein the copolymer comprises from 60 to 95 molar % of the hydrophobic addition polymerizable monomer and from 5 to 40 molar % of acrylic acid or methacrylic acid.

* * * * *